United States Patent [19]

Meyers et al.

[11] Patent Number: 5,236,719
[45] Date of Patent: Aug. 17, 1993

[54] CHEWING GUM AND OTHER COMESTIBLES CONTAINING PURIFIED INDIGESTIBLE DEXTRIN

[75] Inventors: Marc A. Meyers, Naperville; David W. Record, River Forest, both of Ill.

[73] Assignee: Wm. Wrigley Jr. Company, Chicago, Ill.

[21] Appl. No.: 802,659

[22] Filed: Dec. 3, 1991

Related U.S. Application Data

[63] Continuation-in-part of PCT/US91/07127, Sep. 27, 1991.

[51] Int. Cl.$^5$ ............................................. A23G 3/30
[52] U.S. Cl. .......................................... 426/3; 426/658; 426/660; 426/804
[58] Field of Search .................................. 426/3-6, 426/658, 804, 660

[56] References Cited

U.S. PATENT DOCUMENTS

| | | | |
|---|---|---|---|
| 3,974,032 | 8/1976 | Harjes et al. | 426/658 |
| 4,241,091 | 12/1980 | Stroz et al. | 426/4 |
| 4,518,581 | 5/1985 | Miyake et al. | 426/3 |
| 4,579,738 | 4/1986 | Cherukuri et al. | 426/3 |
| 4,581,234 | 4/1986 | Cherukuri et al. | 426/3 |
| 4,587,125 | 5/1986 | Cherukuri et al. | 426/3 |
| 4,622,233 | 11/1986 | Torres | 426/3 |
| 4,671,961 | 6/1987 | Patel | 426/3 |
| 4,671,967 | 6/1987 | Patel et al. | 426/3 |
| 4,695,463 | 9/1987 | Yang et al. | 424/440 |
| 4,711,784 | 12/1987 | Yang | 426/5 |
| 4,728,515 | 3/1988 | Patel et al. | 426/3 |
| 4,740,376 | 4/1988 | Yang | 426/5 |
| 4,803,082 | 2/1989 | Cherukuri et al. | 424/493 |
| 4,948,596 | 8/1990 | Bunick et al. | 426/3 |
| 5,120,550 | 6/1992 | Van der Schueren | 426/3 |
| 5,120,551 | 6/1992 | Yatka | 426/3 |

FOREIGN PATENT DOCUMENTS

| | | |
|---|---|---|
| 0368451 | 5/1990 | European Pat. Off. |
| 0435656 | 7/1991 | European Pat. Off. |
| 0477089 | 3/1992 | European Pat. Off. |
| 0485304 | 5/1992 | European Pat. Off. |
| 0487187 | 5/1992 | European Pat. Off. |
| 2-100695 | 4/1990 | Japan |
| 2-145169 | 6/1990 | Japan |
| 2-154664 | 6/1990 | Japan |
| 3-47831 | 7/1991 | Japan |
| 3-47832 | 7/1991 | Japan |
| WO92/09208 | 6/1992 | PCT Int'l Appl. |

OTHER PUBLICATIONS

Brochure entitled "All about Pine Fibre," published by Matsutani Chemical Industry Co., Ltd., Oct. 1989.
Brochure entitled "Basic Properties of Fibersol-2," published by Matsutani Chemical Industry Co., Ltd., undated.
Sugars and Sweeteners, edited by Norman Kretchmer and Clarie B. Hollenbeck, published by CRC Press, 1991, pp. 184–195.

*Primary Examiner*—Jeanette Hunter
*Attorney, Agent, or Firm*—Willian Brinks Olds Hofer Gilson & Lione

[57] ABSTRACT

Chewing gums and other comestible are made with an indigestible dextrin that has been purified to remove fermentable components. The purified indigestible dextrin has a human plaque acidity test pH response of 5.7 or greater. The purified indigestible dextrin comprises at least in part, and in some instances, all of the bulking agent in a non-cariogenic chewing gum.

20 Claims, No Drawings

CHEWING GUM AND OTHER COMESTIBLES CONTAINING PURIFIED INDIGESTIBLE DEXTRIN

CROSS REFERENCE TO RELATED APPLICATION

This application is a continuation-in-part of application Ser. No. PCT/US91/07127 filed Sep. 27, 1991, the disclosure of which is incorporated herein by reference.

BACKGROUND OF THE INVENTION

The present invention relates to improved compositions of chewing gum and other comestibles. More particularly, the invention relates to improving chewing gum and other comestibles by the use of non-cariogenic bulking agents. The improved non-cariogenic chewing gum compositions may be used in a variety of chewing gum products such as confectionery coated chewing gum products.

In recent years, efforts have been devoted to replace sugar and sugar syrups normally found in chewing gum with other carbohydrates and noncarbohydrates. Non-sugar or sugar-free chewing gum, which is growing in popularity, uses sugar alcohols or polyols to replace sugar and sugar syrups. The most popular polyols are sorbitol, mannitol, and xylitol. New polyols are being developed using new technology to replace these polyols. New polyols have various unique properties which can improve the taste, texture, and shelf life properties of chewing gum for consumers.

The non-sugar polyols have the advantage of not contributing to dental caries of consumers, as well as being able to be consumed by diabetics. However, all polyols have the disadvantage of causing gastro-intestinal disturbances if consumed in too great of a quantity. Therefore it would be a great advantage to be able to use a carbohydrate or carbohydrate-like food ingredient for chewing gum that would act as a bulking agent, but not contribute to dental caries nor cause gastro-intestinal disturbances.

One such bulking agent is indigestible dextrin, purified to remove any fermentable components, one variety of which is designated under the tradename of Fibersol G. The non-purified version of this bulking agent or bulk sweetener has recently attained GRAS (generally recognized as safe) status from the USFDA. The non-purified version of the bulking agent is also approved for use in Japan. Although a carbohydrate, purified indigestible dextrin does not contribute to dental caries, does not cause gastro-intestinal disturbances and does not significantly contribute to calories. Thus, this ingredient's use in chewing gum could be a definite improvement.

The manufacture of indigestible dextrin is disclosed in EPO Patent Publication No. 0 368 451, and its method of preparation is disclosed in other related patent publications, including Japanese Patent Applications Nos. 2100695; 2145169 and 2154664. Other patent documents that mention indigestible dextrin include Japanese Patent Publication Nos. 91-047831 and 91-047832.

Additional information is supplied in two brochures from Matsutani Chemical Industry Co., Ltd. of Japan, titled "All About Pinefibre" and "Basic Properties of Fibersol 2."

A similar type material, starch hydrolyzate dextrin, is disclosed in U.S. Pat. No. 3,974,032. The product is a low D.E. starch hydrolyzate of improved stability prepared by enzymatic hydrolysis of dextrins.

SUMMARY OF THE INVENTION

The present invention is a method of producing non-cariogenic chewing gum and other comestibles with a purified indigestible dextrin, as well as the chewing gum and comestibles so produced. Another aspect of the invention is a method of purifying the indigestible dextrin by treating the indigestible dextrin to a process selected from the group consisting of fermentation, liquid chromatography, gel permeation chromatography, ultrafiltration and glucose oxidase and maltase enzyme hydrolysis to consume or remove the fermentable components and any components that would be hydrolyzed to fermentable components by enzymes in the oral cavity.

The purified indigestible dextrin may be used in a powdered form, or provided in a low- or high-moisture syrup. The purified indigestible dextrin may be used in non-sugar gum formulations, replacing part or all of the sorbitol, mannitol, other polyols, or carbohydrates. Non-sugar formulations may include low- or high-moisture, sugar-free chewing gums.

This bulking agent, purified indigestible dextrin, when used according to the present invention, gives a non-cariogenic chewing gum or other comestible. Also, the chewing gum will have an improved texture, an improved shelf life and unique flavor/sweetness quality. Even though indigestible dextrin is a carbohydrate, it is purified and otherwise non-cariogenic, and does not significantly contribute to calories, giving a highly consumer-acceptable chewing gum product.

DETAILED DESCRIPTION OF THE PREFERRED EMBODIMENTS

Unless otherwise stated, all percentages herein are percentage by weight.

Starches are available from a wide variety of grains, but the most common are corn starch or potato starch. Starches are readily hydrolyzed by acid or enzyme to shorten chain carbohydrates composed of glucose units. Completely hydrolyzed starch will yield glucose. Intermediate products are glucose syrups, maltodextrins, dextrins, and modified starch. All starches are composed of mostly $\alpha$-1,4 linkages between the glucose units, with relatively few $\alpha$-1,2; $\alpha$-1,3; and $\alpha$-1,6 bonds. As starches are hydrolyzed to dextrins, maltodextrins, and corn syrups, these products continue to have glucose units linked by $\alpha$-1,4 bonds. Maltodextrins and corn syrups, having a high level of $\alpha$-1,4 bonds, are hydrolyzed by salivary alpha amylase to fermentable carbohydrates, which are then converted by bacteria in the mouth to acids, which in turn causes dental caries. Dextrins, however, are made in a unique fashion compared to maltodextrins and glucose syrups. Dextrins are made by hydrolyzing starches in a dry state by the addition of acid and heat (roasting). The roasting process causes glucose obtained by hydrolysis to recombine with the larger carbohydrates to form $\alpha$-1,2, $\alpha$-1,3, and $\alpha$-1,6 bonds. Additional roasting gives highly branched carbohydrates or pyrodextrins.

One supplier has further hydrolyzed the pyrodextrins with enzyme treatments to make a very highly branched product that has properties like a maltodextrin, but is virtually indigestible. This product, called Fibersol or indigestible dextrin, is very water soluble, but has digestion properties like fiber.

There are several types of indigestible dextrin. There is Pinefiber and Pinefiber C, obtained from potato starch, and Fibersol 1 and Fibersol 2, obtained from corn starch. Fibersol 1 (DE=8-12) has a higher molecular weight, while Fibersol 2 (DE=13-18) has a lower molecular weight. Indigestible dextrin is also available as a low density material called Dexflow or Pineflow. All of these materials have similar properties and are referred to herein generically as indigestible dextrin. Any of these forms may be purified and used in chewing gum and other comestibles.

Even though Fibersol 2 brand indigestible dextrin is highly branched, it has similar properties to a maltodextrin. As a result, Fibersol 2 has attained GRAS status from the USA Food and Drug Administration as a maltodextrin. Fibersol 1 has been granted GRAS status as a dextrin. In Japan, Fibersol is considered a fat-replacer, low calorie bulking agent. The calorie value of Fibersol is 0.8 Kcal/g, compared to 4.0 Kcal/g for glucose. This indigestible dextrin is being marketed in the U.S. by Fibersol America, a division of Matsutani Chemical Industry Co., Ltd. of Hyogo-Pref., Japan.

Human plaque acidity testing is one of the methods internationally recognized (American Dental Association, Swiss Health Authority) as suitable for evaluating whether a food has the potential to cause cavities. The method is based on the known mechanism of caries development. If no acid (pH>5.7) is produced from the food then there is no possibility that enamel will erode and eventually develop into a cavity.

The technique used for such plaque acidity testing is to install a miniature pH electrode in a partial denture. The subjects wear the denture for several days in order to allow the normal accumulation of plaque on the electrode. Subjects report to the test laboratory, the electrode is calibrated, and the pH responses to test foods and controls are recorded. If the pH response to a test food does not drop below pH 5.7 during or after eating, the food is accepted as not forming enough acid to cause mineral loss from teeth.

A sample of Fibersol 2 was tested for dental effects by this plaque pH test. Even though it was considered virtually indigestible, the material showed a reduction of plaque pH similar to expected results of maltodextrin, below a pH of 5.7. Analysis of the sample of Fibersol 2 used in the plaque pH test showed that it contained:

96.38% higher saccharide
1.90% maltose
0.53% glucose
0.38% maltosan
0.53% fructose and
0.29% levoglucosan.

The maltose, glucose, and fructose (making up 2.96% of the Fibersol 2) are fermentable, which may have caused the resulting low pH from the plaque pH tests. Further analysis of other samples of Fibersol 2 indicated that Fibersol 2 may contain up to about 10% glucose, fructose and maltose.

Removal of the fermentable components can be done by yeast fermentation, various types of chromatography, including liquid chromatography and gel permeation chromatography, ultrafiltration, and the use of glucose oxidase and maltase enzyme systems.

The yeast fermentation process is one method of eliminating fermentable components from Fibersol 2 or other indigestible dextrins. The process involves the following steps:

1) Prepare a 20% solution of dextrin in water and adjust pH to 4-4.5.
2) Add 0.5% Bakers Yeast (by weight of dextrin) and stir constantly, at 20°-35° C. for 4-16 hours or until all glucose and maltose is gone as analyzed by HPLC.
3) When completed, bring solution to a boil for 5-10 minutes to inactivate yeast.
4) Filter out the insoluble portion.
5) Evaporate, freeze dry or spray dry the filtrate.
6) Optionally, the filtrate may be decolorized by treatment with activated carbon and/or treated through an ion-exchange column to remove degraded protein and to deionize the filtrate.

Applicants requested Matsutani, the supplier of Fibersol 2, to make Fibersol 2 with no dextrose, maltose, or other fermentable sugars. Matsutani has recently produced such a purified material, which Matsutani has designated Fibersol G.

Samples of a Fibersol G powder (which appeared to be spray dried) were sent to the Dental Institute of the University of Zurich, Switzerland, for human plaque acidity testing. In the first 22 minutes of the testing, a stable baseline was obtained by the subject first chewing paraffin from time 0-2 min. The subject then rinsed with 15 ml of 10% aqueous Fibersol G solution for 2 minutes and the pH was monitored for an additional 40 minutes. At minute 64, the subject rinsed with 0.3M sucrose to validate the test. This control ensures that the system is capable of detecting acid if it were produced by the plaque. At the end of the test session, the subject again chewed paraffin so that the plaque acidity resulting from the sucrose is neutralized.

Results indicated that the plaque pH remained high (above 5.7) during the test procedure, thus indicating that Fibersol G does not contribute to dental caries. Fibersol G is hypoacidogenic and therefore non-cariogenic to a degree comparable to polyols such as sorbitol or mannitol.

Even though Fibersol G is considered a maltodextrin, based on these tests its unique non-cariogenic potential allows it to be useful in sugar-free confections such as chewing gum and candies, and in a wide variety of other foods. The purified indigestible dextrin may be combined with other bulk sweeteners for use in chewing gum, including but not limited to sugar alcohols such as sorbitol, mannitol, xylitol, maltitol, lactitol, palatinit, and hydrogenated starch hydrolysates. The purified indigestible dextrin may be combined in the gum formulation or co-dried or blended with the other bulk sweeteners prior to use in the gum formulation. Co-drying may be done by various methods of spray drying, fluid bed coating, coacervation, and other granulating or agglomerating techniques.

Fibersol G may be used in sugar-free chewing gum, confections and other foods in the powder form or dissolved in water to a concentration of about 60-80% solids. It can act as a bulking agent and replace materials like polyols such as sorbitol, mannitol, and xylitol, or be used in a syrup form to replace glycerin and hydrogenated starch hydrolysates (HSH), or even be used to replace other bulking agents like polydextrose (from Pfizer Chemical Co.) or other carbohydrate bulking agents. Fibersol G can also be used in combination with all other non-cariogenic sweeteners and bulking agents.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95% by weight of the gum. More preferably the insoluble gum base comprises between 10 and 50 percent by weight of the gum and most preferably about 20 to about 35% by weight of the gum.

The gum base typically also includes a filler component. The filler component may be calcium carbonate, magnesium carbonate, talc, dicalcium phosphate or the like. The filler may constitute between about 5 and about 60% by weight of the gum base. Preferably, the filler comprises about 5 to about 50% by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise bulking agents (which are generally sweeteners), softeners, other sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5% to about 15.0% by weight of the chewing gum. Softeners contemplated by the present invention include glycerin, propylene glycol, lecithin, and combinations thereof. Further, aqueous sweetener solutions such as those containing sorbitol, hydrogenated starch hydrolysates and combinations thereof may be used as softeners and binding agents in gum.

The bulking agents in the present invention comprise about 1% to about 95%, preferably about 5% to about 90%, and most preferably about 20% to about 60% of the gum compositions. At least a portion of the bulking agents comprise indigestible dextrin that is essentially free of fermentable components and components that can be broken down into fermentable components by enzymes present in the oral cavity so as to not produce a pH below 5.7 in the oral cavity when the gum is chewed. In one embodiment, the bulking agent will be free of any polyols. In another embodiment, the bulking agent will comprise about 5% to about 50% purified indigestible dextrin and about 5% to about 50% of a polyol selected from the group consisting of sorbitol, mannitol, xylitol, maltitol, palatinit, hydrogenated starch hydrolysates, lactitol and mixtures thereof.

As mentioned above, the purified indigestible dextrin solids/syrup bulk sweetener of the present invention will most likely be used in sugar-free gum formulations. Generally sugarless sweeteners include components with sweetening characteristics but which are devoid of the commonly known sugars and comprise, but are not limited to, sugar alcohols such as sorbitol, mannitol, xylitol, hydrogenated starch hydrolysates, maltitol and the like, alone or in any combination. Depending on the particular sweetness release profile and shelf-stability needed, the indigestible dextrin solid/syrup bulk sweeteners of the present invention can also be used in combination with coated or uncoated high-potency sweeteners including, but not limited to, thaumatin, aspartame, acesulfame K, sodium saccharin, glycyrrhizin, alitame, cyclamate, stevioside and dihydrochalcones.

A flavoring agent may be present in the chewing gum in an amount within the range of from about 0.1% to about 10.0% and preferably from about 0.5% to about 3.0% of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLES 1-15

(Tables I-III)

These examples demonstrate how Fibersol G may be used in a variety of chewing gum formulations at various levels. Table I shows a low moisture sugar-free gum. Table II shows a higher moisture sugarless gum. Table III shows a more typical gum formula with HSH syrup.

TABLE I

| | (WEIGHT PERCENT) | | | | |
| --- | --- | --- | --- | --- | --- |
| | EX. 1 | EX. 2 | EX. 3 | EX. 4 | EX. 5 |
| BASE | 25.5 | 25.5 | 25.5 | 25.5 | 25.5 |
| SORBITOL | 50.0 | 46.0 | 41.0 | 26.0 | 0.0 |
| MANNITOL | 12.0 | 12.0 | 12.0 | 12.0 | 12.0 |

TABLE I-continued

| | (WEIGHT PERCENT) | | | | |
|---|---|---|---|---|---|
| | EX. 1 | EX. 2 | EX. 3 | EX. 4 | EX. 5 |
| GLYCERIN | 10.0 | 10.0 | 10.0 | 10.0 | 11.0 |
| FLAVOR | 1.5 | 1.5 | 1.5 | 1.5 | 1.5 |
| FIBERSOL G | 1.0 | 5.0 | 10.0 | 25.0 | 50.0 |

TABLE II

| | (WEIGHT PERCENT) | | | | |
|---|---|---|---|---|---|
| | EX. 6 | EX. 7 | EX. 8 | EX. 9 | EX. 10 |
| BASE | 25.5 | 25.5 | 25.5 | 25.5 | 25.5 |
| SORBITOL | 50.0 | 46.0 | 41.0 | 26.0 | 0.0 |
| LIQUID SORBITOL* | 10.0 | 10.0 | 10.0 | 10.0 | 11.0 |
| MANNITOL | 10.0 | 10.0 | 10.0 | 10.0 | 10.0 |
| GLYCERIN | 2.0 | 2.0 | 2.0 | 2.0 | 2.0 |
| FLAVOR | 1.5 | 1.5 | 1.5 | 1.5 | 1.5 |
| FIBERSOL G | 1.0 | 5.0 | 10.0 | 25.0 | 50.0 |

*Sorbitol liquid contains 70% sorbitol, 30% water

TABLE III

| | (WEIGHT PERCENT) | | | | |
|---|---|---|---|---|---|
| | EX. 11 | EX. 12 | EX. 13 | EX. 14 | EX. 15 |
| BASE | 25.5 | 25.5 | 25.5 | 25.5 | 25.5 |
| SORBITOL | 50.0 | 46.0 | 41.0 | 26.0 | 0.0 |
| HSH SYRUP* | 10.0 | 10.0 | 10.0 | 10.0 | 10.0 |
| MANNITOL | 8.0 | 8.0 | 8.0 | 8.0 | 9.0 |
| GLYCERIN** | 4.0 | 4.0 | 4.0 | 4.0 | 4.0 |
| FLAVOR | 1.5 | 1.5 | 1.5 | 1.5 | 1.5 |
| FIBERSOL G | 1.0 | 5.0 | 10.0 | 25.0 | 50.0 |

*Lycasin brand hydrogenated starch hydrolysate syrup
**Glycerin and HSH syrup may be blended or co-evaporated

EXAMPLES 16-27

(Table IV)

These examples show how Fibersol G may be used with polyols in various sugar-free gum formulations.

TABLE IV

| | (WEIGHT PERCENT) | | | | | | | | | | | |
|---|---|---|---|---|---|---|---|---|---|---|---|---|
| | EX. 16 | EX. 17 | EX. 18 | EX. 19 | EX. 20 | EX. 21 | EX. 22 | EX. 23 | EX. 24 | EX. 25 | EX. 26 | EX. 27 |
| BASE | 25.5 | 25.5 | 25.5 | 25.5 | 25.5 | 25.5 | 25.5 | 25.5 | 25.5 | 25.5 | 25.5 | 25.5 |
| GLYCERIN | 2.0 | 2.0 | 2.0 | 2.0 | 2.0 | 2.0 | 8.0 | 8.0 | 8.0 | 2.0 | 3.0 | 2.0 |
| SORBITOL | 44.0 | 34.0 | 34.0 | 29.0 | 28.0 | — | 32.0 | 27.0 | 22.0 | 31.0 | 10.0 | — |
| MANNITOL | — | 10.0 | 10.0 | 10.0 | 10.0 | 6.0 | 8.0 | 8.0 | 8.0 | — | — | — |
| SORBITOL LIQUID | 17.0 | 17 | — | — | — | — | 5.0 | — | — | — | — | — |
| LYCASIN HSH SYRUP | — | — | 17.0 | 12.0 | 8.0 | 10.0 | — | 5.0 | 5.0 | 5.0 | 10.0 | 10.0 |
| MALTITOL | — | — | — | 10.0 | — | — | — | 5.0 | — | — | — | — |
| XYLITOL | — | — | — | — | 15.0 | 15.0 | — | — | 15.0 | — | — | — |
| LACTITOL | — | — | — | — | — | — | 10.0 | 10.0 | 10.0 | — | — | — |
| PALATINIT | — | — | — | — | — | — | — | — | 10.0 | 10.0 | 25.0 | 21.0 |
| FLAVOR | 1.5 | 1.5 | 1.5 | 1.5 | 1.5 | 1.5 | 1.5 | 1.5 | 1.5 | 1.5 | 1.5 | 1.5 |
| FIBERSOL G | 10.0 | 10.0 | 10.0 | 10.0 | 10.0 | 40.0 | 10.0 | 10.0 | 10.0 | 10.0 | 25.0 | 40.0 |

EXAMPLES 28-38

(Table V and VI)

These examples show how Fibersol G powder and a 75% solids Fibersol G syrup can be used together to obtain non-cariogenic, low calorie gum formulations that do not contain any other carbohydrates and polyols.

TABLE VI

| | (WEIGHT PERCENT) | | | | |
|---|---|---|---|---|---|
| | EX. 28 | EX. 29 | EX. 30 | EX. 31 | EX. 32 |
| GUM BASE | 19.2 | 25.5 | 25.5 | 25.5 | 40.0 |
| GLYCERIN | 2.0 | 2.0 | 7.0 | 7.0 | 2.0 |
| FIBERSOL G POWDER | 57.8 | 46.0 | 41.0 | 51.0 | 35.5 |
| FIBERSOL G SYRUP* | 20.0 | 25.0 | 25.0 | 15.0 | 20.0 |
| FLAVOR | 1.0 | 1.5 | 1.5 | 1.5 | 2.5 |

*Fibersol syrup may also be preblended with glycerin and/or propylene glycol and co-evaporated to reduce moisture.

TABLE VII

| | (WEIGHT PERCENT) | | | | | |
|---|---|---|---|---|---|---|
| | EX. 33 | EX. 34 | EX. 35 | EX. 36 | EX. 37 | EX. 38 |
| GUM BASE | 25.5 | 25.5 | 25.5 | 25.5 | 50.0 | 70.0 |
| GLYCERIN | 2.0 | 2.0 | 7.0 | 15.0 | 2.0 | 1.0 |
| FIBERSOL G POWDER | 51.0 | 61.0 | 46.0 | 48.0 | 35.5 | 20.0 |
| FIBERSOL G SYRUP* | 20.0 | 10.0 | 20.0 | 10.0 | 10.0 | 6.0 |
| FLAVOR | 1.5 | 1.5 | 1.5 | 1.5 | 2.5 | 3.0 |

The formulations in all the above tables may also contain high intensity artificial sweeteners from about 0.02% to about 0.1% for sweeteners like alitame, thaumatin, and dihydrochalcone, and from about 0.1% to about 0.4% for sweeteners like aspartame, sucralose, acesulfame and saccharin.

EXAMPLES 39 to 41

Fibersol G may be used in a sugarless, non-cariogenic hard candy either as a powder form or a syrup form as shown in the following formulas.

| Fruit flavored hard candy: | |
|---|---|
| Example 39 | % |
| Xylitol Gum | 15.8 |
| Fibersol G powder | 34.8 |
| Fibersol G syrup (75% solids) | 38.0 |
| Water | 11.0 |
| Citric Acid | 0.3 |
| Artificial sweetener/fruit flavor/color | as needed |

| Butterscotch hard candy: | |
|---|---|
| Example 40 | % |
| Fibersol G powder | 53.6 |
| Sorbitol | 26.4 |
| Water | 17.66 |
| Butter | 2.06 |
| Salt | 0.12 |

-continued

| | |
|---|---|
| Natural and artificial flavor | 0.16 |

Hard candy:

| Example 41 | % |
|---|---|
| Fibersol G powder | 80.0 |
| Maltitol syrup (75% solids) | 10.0 |
| Xylitol | 9.35 |
| Aspartame | 0.35 |
| Salt | 0.12 |
| Citric acid/flavor/color | as needed |

Procedure: Hard candies are made by the following procedure:
1) In a stainless steel, steam jacketed kettle, mix Fibersol G powder, syrup, xylitol, water, sorbitol, salt and heat to form a thick syrup.
2) Continue to cook and mix until a temperature of about 300° F. and a moisture level of about 1–2% is obtained.
3) Pour heavy syrup onto stainless steel cooling table.
4) Add citric acid, artificial ingredients, flavors and color, butter, and mix by kneading.
5) Allow to cool to room temperature and cut as needed.

EXAMPLE 42

(Candy Compressed Tablet-Breath Mints)

Fibersol may be used in a sugarless pressed tablet with the following formula and procedure:

| | % |
|---|---|
| Sorbitol | 49.9 |
| Fibersol G powder | 48.9 |
| Aspartame | 0.1 |
| Magnesium stearate | 1.0 |
| Peppermint flavor | 0.1 |

Procedure:
1) Weigh ingredients into suitable containers.
2) Place sorbitol and Fibersol G powder in a mixer bowl and add flavor and sweetener.
3) Mix for 3 minutes.
4) Add magnesium stearate and mix three minutes.
5) Start tableting and adjust size, weight, and hardness.

EXAMPLE 43

(Sugarless Taffy)

Fibersol G may be used to prepare a sugar-free taffy by the following formula and procedure:

| | Formula: | | |
|---|---|---|---|
| | % As Is | % DSB | 20# (9.072 Kg) Batch |
| Fibersol G syrup | 94.5 | 92.7 | 18.9 (8.573 Kg) |
| 110° F. M.P. vegetable oil | 5.25 | 7.0 | 1.05 (0.476 Kg) |
| Lecithin | 0.25 | 0.3 | 0.3 (0.136 Kg) |
| Flavor/color/acid/sweetener | As needed | | |

Procedure:
1. Weigh Fibersol G syrup into an atmospheric cooker, such as a Savage open fire cooker, and cook to about 255° F. (123.9° C.). No agitation is required for this step.
2. Let cooked Fibersol G syrup cool to about 230° F. and add fat and lecithin; fat does not have to be premelted. Mix until uniform.
3. Pour mass on oiled cooling table. Side bars may be necessary for initial cooling if table is small.
4. Work in color, flavor and acid on the slab before pulling (color and flavor may also be added on puller). Cool to plastic texture.
5. Pull cooked mass until desired texture is attained. Cut and wrap in moisture resistant packaging.

EXAMPLE 44

(Sugar-Free Caramel)

Fibersol G may be used to prepare a sugar-free caramel by the following formula and procedure:

| | |
|---|---|
| Fibersol G syrup (75% solids) | 58.53% |
| Evaporated milk | 33.24 |
| Coconut oil, 92° F. (33° C.) | 7.68 |
| Lecithin | 0.20 |
| Salt | 0.20 |
| Aspartame | 0.11 |
| Vanillin | 0.04 |
| Total | 100.00% |

Procedure:
1. Prepare aspartame slurry by mixing ⅓ ratio of aspartame to coconut oil in a high shear blender for about 30 seconds.
2. Premix all ingredients, except aspartame slurry, half of the evaporated milk and the vanillin, for 5 minutes at about 120° F. (48.9° C.).
3. Bring premix to a boil and slowly add the balance of the evaporated milk, maintaining the boil.
4. Cook to the desired texture. Final cook temperature will vary according to the cooking process. A suggested final cook temperature is about 245° F. (118.3° C.).
5. Cool the caramel to about 220° F. (104° C.) and add the aspartame slurry slowly with mixing. Methyl vanillin should also be added at this time.
6. Slab, cut and wrap as desired.

EXAMPLE 45

(Sugarless Gum Drops)

| | % |
|---|---|
| Gelatin 200 bloom type B | 7.0 |
| Crystalline sorbitol | 34.9 |
| Fibersol G syrup (75% solids) | 32.6 |
| Hot Water (80–90° C.) | 14.0 |
| Water | 10.0 |
| Citric acid solution | 1.5 |
| Fruit flavor/color | as needed |

Procedure:
1) Dissolve gelatin directly in hot water.
2) Cook the Fibersol G syrup, sorbitol and water at 115° C., and add gelatin solution.
3) Stir slowly in order to obtain a smooth homogenous mixture.
4) Remove air bubbles with deaeration equipment or other available means.
5) Add citric acid solution, flavor and color.
6) Deposit in cool and dry starch, and sprinkle a little starch onto the articles. Temperature: 70° C. Total solids when depositing: 78° C. Brix.

7) Store the starch tray at room temperature for 24 hours.
8) After removal from the molding starch, oil the articles or sand with mannitol.

Other food items in which Fibersol G may be used as a non-cariogenic bulking agent are:
1) Confections and frostings.
2) Dressings for salads.
3) Frozen dairy deserts and mixes.
4) Gelatins, puddings and fillings.
5) Hard candy.
6) Soft candy.
7) Baked goods and baking mixes.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. A chewing gum composition comprising:
   a) about 5% to about 95% gum base;
   b) about 1% to about 95% bulking agent comprising at least in part indigestible dextrin that is essentially free of fermentable components; and
   c) about 0.1% to about 10% flavor.

2. The chewing gum composition of claim 1 wherein the composition is non-cariogenic.

3. The chewing gum composition of claim 1 wherein the indigestible dextrin has a human plaque acidity test pH response of 5.7 or greater.

4. The chewing gum composition of claim 1 comprising about 10% to about 50% of said gum base, about 5% to about 50% of said indigestible dextrin and about 5% to about 50% of a polyol selected from the group consisting of sorbitol, mannitol, xylitol, maltitol, palatinit, hydrogenated starch hydroysates, lactitol and mixtures thereof.

5. The chewing gum composition of claim 1 wherein the gum composition is free of polyols.

6. The chewing gum composition of claim 1 wherein the bulking agent is essentially free of fermentable components and components that can be broken down into fermentable components by enzymes present in the oral cavity.

7. The chewing gum composition of claim 1 wherein the indigestible dextrin is in the form of an aqueous syrup.

8. A method of making a chewing gum composition comprising the steps of:
   a) providing about 5% to about 95% of a gum base;
   b) providing about 1% to about 95% of a bulking agent comprising at least in part indigestible dextrin that is substantially free of fermentable components;
   c) providing about 0.1% to about 10% flavor; and
   d) mixing the gum base, bulking agent and flavor to make a chewing gum composition.

9. The method of claim 8 wherein the composition is non-cariogenic.

10. The method of claim 8 wherein the indigestible dextrin has a human plaque acidity test pH response of 5.7 or greater.

11. The method of claim 8 wherein the gum base comprises about 10% to about 50% of the gum composition and the bulking agent comprises about 5% to about 50% of said indigestible dextrin and about 5% to about 50% of a polyol selected from the group consisting of sorbitol, mannitol, xylitol, maltitol, palatinit, hydrogenated starch hydroysates, lactitol and mixtures thereof.

12. The method of claim 8 wherein the gum composition is free of polyols.

13. The method of claim 8 wherein the bulking agent is essentially free of fermentable components and components that can be broken down into fermentable components by enzymes present in the oral cavity.

14. The method of claim 8 wherein the indigestible dextrin is in the form of an aqueous syrup.

15. The method of claim 8 wherein the indigestible dextrin is provided in a syrup premixed with a plasticizing agent selected from the group consisting of glycerin, propylene glycol and mixtures thereof.

16. A comestible comprising indigestible dextrin that is essentially free of fermentable components, the comestible also being essentially free of fermentable carbohydrate components.

17. The comestible of claim 16 wherein the comestible is a confectionery.

18. The comestible of claim 16 wherein the comestible is non-cariogenic.

19. The comestible of claim 16 wherein the indigestible dextrin has a human plaque acidity test pH response of 5.7 or greater.

20. The comestible of claim 16 wherein the comestible comprises a hard candy.

* * * * *

(12) EX PARTE REEXAMINATION CERTIFICATE (5434th)
United States Patent
Meyers et al.

(10) Number: US 5,236,719 C1
(45) Certificate Issued: Jul. 4, 2006

(54) CHEWING GUM AND OTHER COMESTIBLES CONTAINING PURIFIED INDIGESTIBLE DEXTRIN

(75) Inventors: Marc A. Meyers, Naperville, IL (US); David W. Record, River Forest, IL (US)

(73) Assignee: Wm. Wrigley Jr. Company, Chicago, IL (US)

Reexamination Request:
No. 90/006,959, Mar. 10, 2004

Reexamination Certificate for:
Patent No.: 5,236,719
Issued: Aug. 17, 1993
Appl. No.: 07/802,659
Filed: Dec. 3, 1991

Related U.S. Application Data

(63) Continuation-in-part of application No. PCT/US91/07127, filed on Sep. 27, 1991.

(51) Int. Cl.
  *A23G 3/30* (2006.01)

(52) U.S. Cl. .................. 426/3; 426/658; 426/660; 426/804

(58) Field of Classification Search ............... 426/3, 426/658, 660, 804
See application file for complete search history.

(56) References Cited

U.S. PATENT DOCUMENTS

| | | | |
|---|---|---|---|
| 4,241,091 A | 12/1980 | Stroz et al. | 426/4 |
| 4,671,961 A | 6/1987 | Patel et al. | 426/3 |
| 4,948,596 A | 8/1990 | Bunick et al. | 426/3 |

FOREIGN PATENT DOCUMENTS

| | | |
|---|---|---|
| EP | 368451 | 5/1990 |
| WO | WO 92/09208 | 6/1992 |

OTHER PUBLICATIONS

Imfeld, "Evaluation of the Cariogenicity of Confectionary by Intra–Oral Wire–Telemetry," 21 *Helvetica Odontologica Acta* 1 (1977).

Klacik, "Continuous Production of Sugar–Free Hard Candies", 69 *The Manufacturing Confectioner* 61 (1989).

Klacik, "Applications in Confectionery: Sugarless Hard Candy Technology Review", 70 *The Manufacturing Confectioner* 69 (1990).

Kopchik, "Reduced Calorie Bulk Ingredients: Polydextrose and Polydextrose II", 70 *The Manufacturing Confectioner* 61 (1990).

Murray, "Polydextrose," *Low Calorie Products* 83 (Birch and Lindley, ed. 1988).

*Primary Examiner*—Arthur L. Corbin

(57) ABSTRACT

Chewing gums and other comestible are made with an indigestible dextrin that has been purified to remove fermentable components. The purified indigestible dextrin has a human plaque acidity test pH response of 5.7 or greater. The purified indigestible dextrin comprises at least in part, and in some instances, all of the bulking agent in a non-cariogenic chewing gum.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4, 5, 11, 12 and 16–20 are cancelled.

Claims 1, 8 and 15 are determined to be patentable as amended.

Claims 2, 3, 6, 7, 9, 10, 13 and 14, dependent on an amended claim, are determined to be patentable.

1. A chewing gum composition comprising:
   a) about [5%] *10%* to about [95%] *50%* gum base;
   b) about 1% to about 95% bulking agent comprising at least in part indigestible dextrin that is essentially free of fermentable components, *wherein the bulking agent comprises about 5% to about 50% of said indigestible dextrin and about 5% to about 50% of a polyol selected from the group consisting of sorbitol, mannitol, xylitol, maltitol, palatinit, hydrogenated starch hydrolysates, lactitol and mixtures thereof*; and
   c) about 0.1% to about 10% flavor.

8. A method of making a chewing gum composition comprising the steps of:
   a) providing about [5%] *10%* to about [95%] *50%* of a gum base;
   b) providing about 1% to about 95% of a bulking agent comprising at least in part indigestible dextrin that is substantially free of fermentable components, *wherein the bulking agent comprises about 5% to about 50% of said indigestible dextrin and about 5% to about 50% of a polyol selected from the group consisting of sorbitol, mannitol, xylitol, maltitol, palatinit, hydrogenated starch hydrolysates, lactitol and mixtures thereof*;
   c) providing about 0.1% to about 10% flavor; and
   d) mixing the gum base, bulking agent and flavor to make a chewing gum composition.

15. [The method of claim 8] *A method of making a chewing gum composition comprising the steps of:*
   a) *providing about 5% to about 95% of a gum base;*
   b) *providing about 1% to about 95% of a bulking agent comprising at least in part indigestible dextrin that is substantially free of fermentable components,* wherein the indigestible dextrin is provided in a syrup premixed with a plasticizing agent selected from the group consisting of glycerin, propylene glycol and mixtures thereof;
   c) *providing about 0.1% to about 10% flavor; and*
   d) *mixing the gum base, bulking agent and flavor to make a chewing gum composition.*

* * * * *